United States Patent
Jinka et al.

(10) Patent No.: US 10,363,840 B2
(45) Date of Patent: Jul. 30, 2019

(54) SPACER HAVING A TOLERANCE ABSORPTION MECHANISM

(71) Applicant: Toyota Boshoku America, Inc., Novi, MI (US)

(72) Inventors: Chandra Jinka, South Lyon, MI (US); Yeshwanth Naveen, New Hudson, MI (US)

(73) Assignee: Toyota Boshoku America, Inc., Novi, MI (US)

( * ) Notice: Subject to any disclaimer, the term of this patent is extended or adjusted under 35 U.S.C. 154(b) by 126 days.

(21) Appl. No.: 15/177,518

(22) Filed: Jun. 9, 2016

(65) Prior Publication Data

US 2017/0080824 A1    Mar. 23, 2017

Related U.S. Application Data

(60) Provisional application No. 62/221,890, filed on Sep. 22, 2015.

(51) Int. Cl.
| | |
|---|---|
| *B60N 2/22* | (2006.01) |
| *B60N 2/68* | (2006.01) |
| *B60N 2/20* | (2006.01) |
| *F16C 11/04* | (2006.01) |
| *F16C 17/10* | (2006.01) |
| *F16C 25/04* | (2006.01) |
| *F16C 27/02* | (2006.01) |

(Continued)

(52) U.S. Cl.
CPC ............... *B60N 2/22* (2013.01); *B60N 2/20* (2013.01); *B60N 2/36* (2013.01); *B60N 2/682* (2013.01); *B60N 2/767* (2018.02); *F16C 11/04* (2013.01); *F16C 17/10* (2013.01); *F16C 25/04* (2013.01); *F16C 27/02* (2013.01); *F16C 27/063* (2013.01); *F16C 33/20* (2013.01); *B60N 2205/20* (2013.01)

(58) Field of Classification Search
CPC . B60N 2/22; B60N 2/767; B60N 2/20; B60N 2/36; B60N 2/682; F16C 11/04; F16C 25/04; F16C 27/02; F16C 27/063; F16C 33/20
USPC .......................... 297/463.1, 362.14, 363, 376
See application file for complete search history.

(56) References Cited

U.S. PATENT DOCUMENTS

| | | |
|---|---|---|
| 2,761,484 A | 9/1956 | Sternick et al. |
| 2,779,375 A | 1/1957 | O'Connor |

(Continued)

FOREIGN PATENT DOCUMENTS

DE    102004063660 A1    7/2006

OTHER PUBLICATIONS

International Search Report and Written Opinion for PCT Application No. PCT/US2016/036588 dated Sep. 20, 2016.

(Continued)

*Primary Examiner* — Syed A Islam
(74) *Attorney, Agent, or Firm* — Carlson, Gaskey & Olds, P.C.

(57) ABSTRACT

An assembly includes a first vehicle seat component, a second vehicle seat component that can pivot relative to the first vehicle seat component, a fastener to secure the first vehicle seat component and second first vehicle seat component together, and a spacer to absorb radial vibrations. The spacer includes a body and at least one flexible leaflet located between the body and the fastener to absorb axial vibrations. The body and the at least one leaflet are integral and monolithic to define a single component.

26 Claims, 5 Drawing Sheets

(51) Int. Cl.
*F16C 27/06* (2006.01)
*F16C 33/20* (2006.01)
*B60N 2/36* (2006.01)
*B60N 2/75* (2018.01)

(56) References Cited

U.S. PATENT DOCUMENTS

| | | | |
|---|---|---|---|
| 3,628,584 A | 12/1971 | Gutshall | |
| 4,193,434 A * | 3/1980 | Wagner | F16B 43/00 411/154 |
| 4,437,784 A | 3/1984 | Peterson | |
| 4,807,330 A * | 2/1989 | Gomes | A47C 4/40 16/261 |
| 5,836,648 A | 11/1998 | Karschin et al. | |
| 6,050,890 A | 4/2000 | Bayer et al. | |
| 6,290,298 B1 | 9/2001 | Lee | |
| 6,394,537 B1 | 5/2002 | DeRees | |
| 7,306,418 B2 | 12/2007 | Kornblum | |
| 7,513,571 B2 | 4/2009 | Hofmann et al. | |
| 8,246,023 B2 | 8/2012 | Cappeller | |
| 8,845,202 B2 | 9/2014 | Teimel | |
| 9,573,501 B2 * | 2/2017 | Shiromura | B60N 2/68 |
| 2004/0208695 A1 | 10/2004 | LaPointe | |
| 2005/0057075 A1 | 3/2005 | Edwards | |
| 2005/0151310 A1 * | 7/2005 | Rodeffer | F16F 1/32 267/161 |
| 2007/0192993 A1 | 8/2007 | Selle | |
| 2010/0014793 A1 | 1/2010 | Bingert | |
| 2011/0204691 A1 | 8/2011 | Schuhmacher et al. | |
| 2012/0192379 A1 | 8/2012 | Amirian et al. | |
| 2015/0041619 A1 | 2/2015 | Ellis et al. | |

OTHER PUBLICATIONS

International Preliminary Report on Patentability for PCT Application No. PCT/US2016/036588 dated Dec. 8, 2017.

* cited by examiner

SPACER HAVING A TOLERANCE ABSORPTION MECHANISM

REFERENCE TO RELATED APPLICATIONS

This application claims priority to U.S. Provisional Application No. 62/221,890 filed on Sep. 22, 2015.

BACKGROUND OF THE INVENTION

A fastener, such a bolt, is used to attach a first vehicle seat component and a second vehicle seat component. The second vehicle seat component pivots relative to the first vehicle seat component. The bolt has a head, a shoulder and a shank. A spacer positioned on the shank of the bolt only absorbs radial tolerances and squeak. An elastomeric ring or felt can be secured or glued to a surface of the shoulder of the bolt to absorb axial tolerances and rattle. The spacer and the elastomeric ring are two separate components.

SUMMARY OF THE INVENTION

In a featured embodiment, an assembly includes a first vehicle seat component, a second vehicle seat component that can pivot relative to the first vehicle seat component, a fastener to secure the first vehicle seat component and second first vehicle seat component together, and a spacer to absorb radial vibrations. The spacer includes a body and at least one flexible leaflet located between the body and the fastener to absorb axial vibrations. The body and the at least one leaflet are integral and monolithic to define a single component.

In another embodiment according to the previous embodiment, the first seat component is a component of a frame subassembly of a vehicle seat back, and the second seat component is a component of a seat cushion.

In another embodiment according to any of the previous embodiments, the second seat component is a resilient assembly.

In another embodiment according to any of the previous embodiments, the fastener includes a shank, a larger diameter shank and a shoulder. The larger diameter shank of the fastener is received in an opening in the spacer, and the at least one leaflet engages the shoulder of the fastener.

In another embodiment according to any of the previous embodiments, the body includes a small diameter portion and a larger diameter portion. The larger diameter portion is defined by a flange.

In another embodiment according to any of the previous embodiments, the at least one leaflet is attached to the body by the flange.

In another embodiment according to any of the previous embodiments, a circumferential space is defined between each of the at least one leaflet and the body. A radial space is defined between a straight surface of each the at least one leaflet and a flat surface of the flange.

In another embodiment according to any of the previous embodiments, the at least one leaflet is approximately 0.6 mm above a surface of the body.

In another embodiment according to any of the previous embodiments, the at least one flexible leaflet extends around the body in a circumferential direction.

In another embodiment according to any of the previous embodiments, the at least one flexible leaflet comprises three leaflets.

In another featured embodiment, an assembly includes a first vehicle seat component. A second vehicle seat component that pivots relative to the first vehicle seat component. A fastener secures the first vehicle seat component and second first vehicle seat component together. The fastener includes a shank, a larger diameter shank and a shoulder. The larger diameter shank of the fastener is received in an opening in the spacer, and the at least one leaflet engages the shoulder of the fastener. A spacer absorbs radial vibrations. The spacer includes a body and at least one flexible leaflet located between the body and the fastener to absorb axial vibrations. The body and the at least one leaflet are integral and monolithic to define a single component. The at least one leaflet extends around the body in a circumferential direction, and the at least one leaflet comprises three leaflets.

In another embodiment according to any of the previous embodiments, the first seat component is a component of a frame subassembly of a vehicle seat back, and the second seat component is a component of a seat cushion.

In another embodiment according to any of the previous embodiments, the second seat component is a resilient assembly.

In another embodiment according to any of the previous embodiments, the body includes a small diameter portion and a larger diameter portion. The larger diameter portion is defined by a flange.

In another embodiment according to any of the previous embodiments, the at least one flexible leaflet is attached to the body by the flange.

In another embodiment according to any of the previous embodiments, a circumferential space is defined between each of the at least one flexible leaflet and the body, and a radial space is defined between a straight surface of each the at least one leaflet and a flat surface of the flange.

In another embodiment according to any of the previous embodiments, the at least one leaflet is approximately 0.6 mm above a surface of the body.

These and other features of the present invention can be best understood from the following specification and drawings, the following of which is a brief description.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
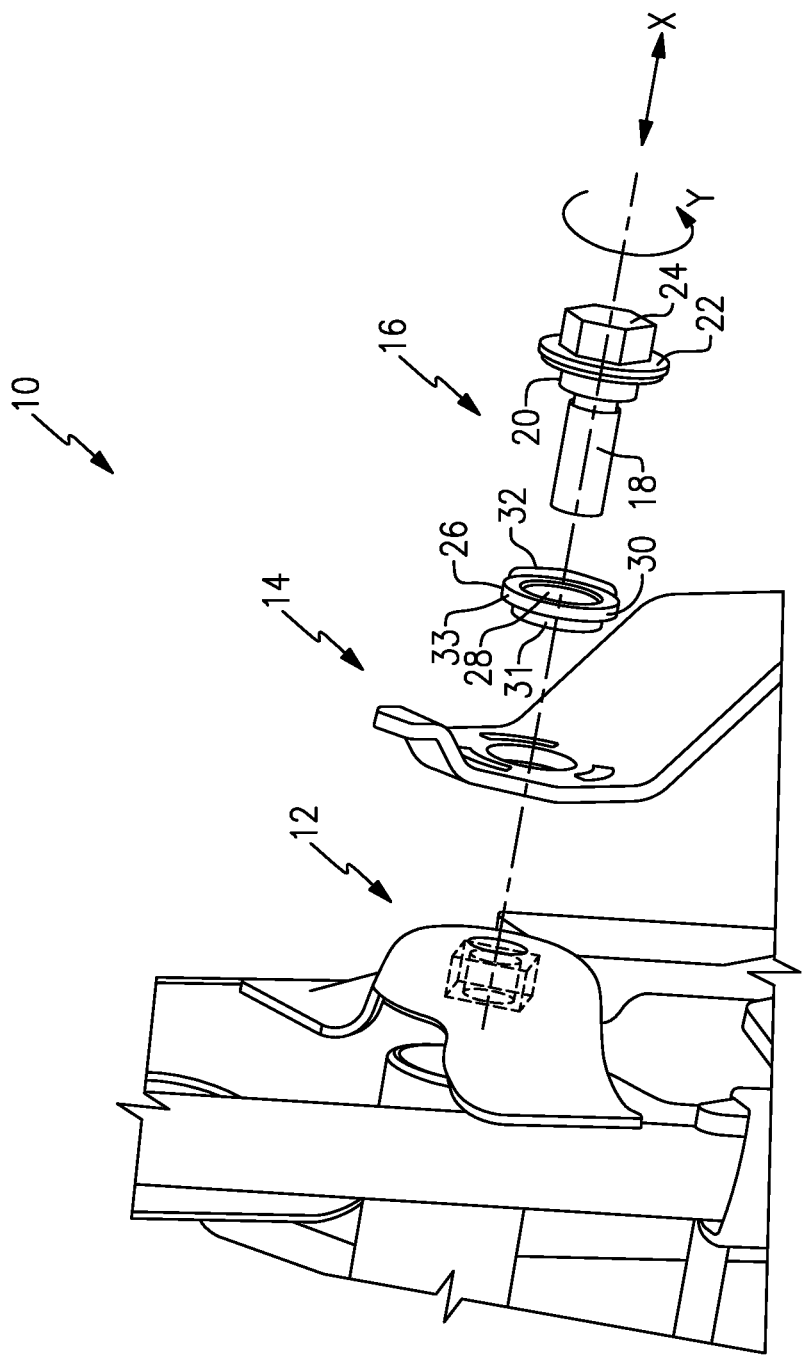
FIG. 1 illustrates an assembly of a vehicle seat.

FIG. 1 illustrates an assembly 10 including a first vehicle seat component 12 and a second vehicle seat component 14. In one example, the first vehicle seat component 12 is a component of a frame subassembly of a vehicle seat back, and the second vehicle seat component 14 is a component of a seat cushion. In one example, the second vehicle seat component 14 is a spring assembly. The second vehicle seat component 14 pivots relative to the first vehicle seat component 12. In one example, the second vehicle seat component 14 is made of steel. It is to be understood that other vehicle seat components can be used. For example, one of the vehicle seat components 12 and 14 can be an armrest.

A fastener 16 pivotably attaches the second vehicle seat component 14 to the first vehicle seat component 12. That is, the second vehicle seat component 14 moves and pivots relative to the first vehicle seat component 12. In one example, the fastener 16 is a bolt. The fastener 16 includes a shank 18 that extends along a longitudinal axis X, a larger diameter shank 20, and a shoulder 22. A head 24 is located on the shoulder 22 that can be engaged by a tool and turned in the direction Y to tighten or loosen the fastener 16. In one example, the head 24 is a hex head. The fastener 16 is made of steel.

A spacer 26 (shown generally in FIG. 1) includes an opening 28. In one example, the spacer 26 is made of a thermoplastic, such as polyoxymethylene (POM). The larger diameter shank 20 of the fastener 16 is received in the opening 28 of the spacer 26.

Figure 2A:
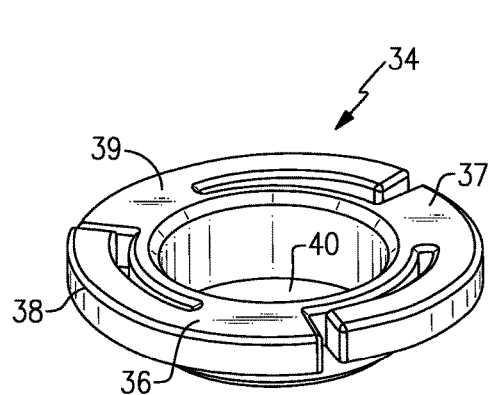
FIG. 2A illustrates a perspective view of a first spacer.
Figure 2B:
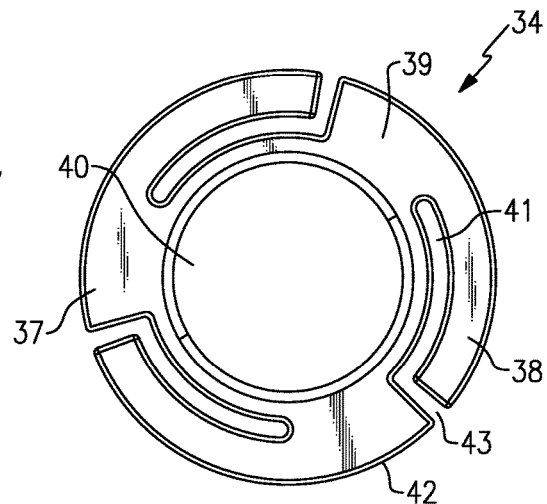
FIG. 2B illustrates a top view of the first spacer.
Figure 2C:
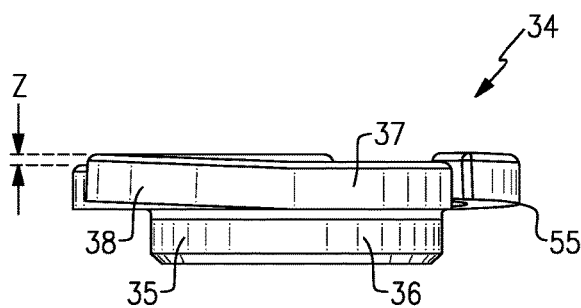
FIG. 2C illustrates a side view of the first spacer.
Figure 2D:
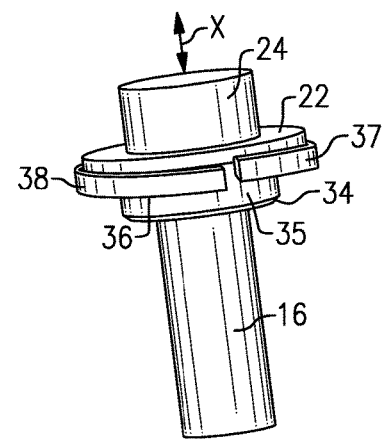
FIG. 2D illustrates the first spacer installed on a fastener.
Figure 3A:
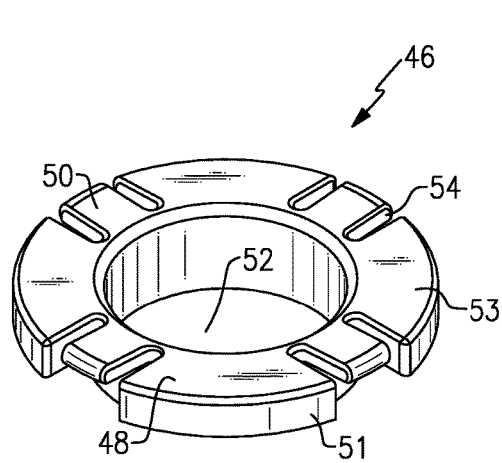
FIG. 3A illustrates a perspective view of a second spacer.
Figure 3B:
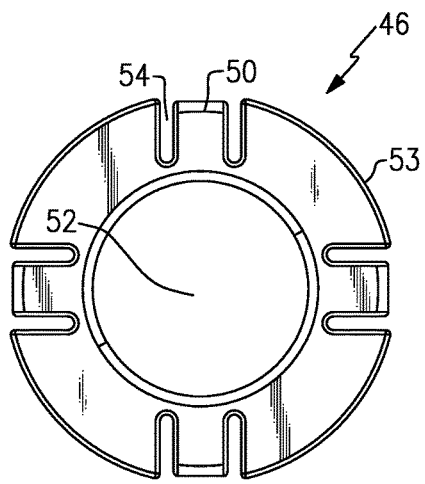
FIG. 3B illustrates a top view of the second spacer.
Figure 3C:
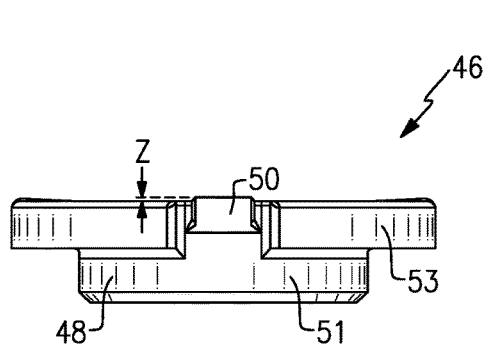
FIG. 3C illustrates a side view of the second spacer.
Figure 3D:
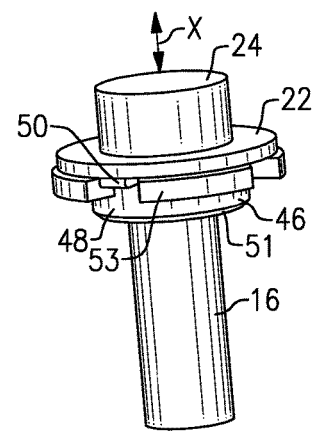
FIG. 3D illustrates the second spacer installed on the fastener.
Figure 4A:
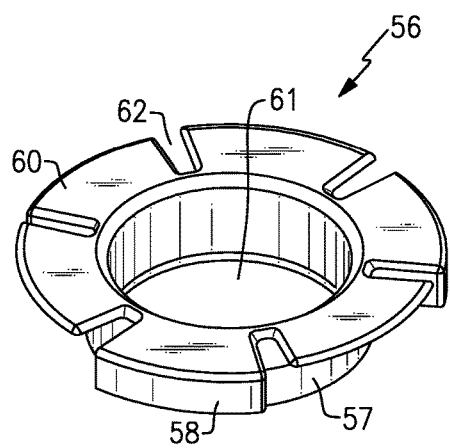
FIG. 4A illustrates a perspective view of a third spacer.
Figure 4B:
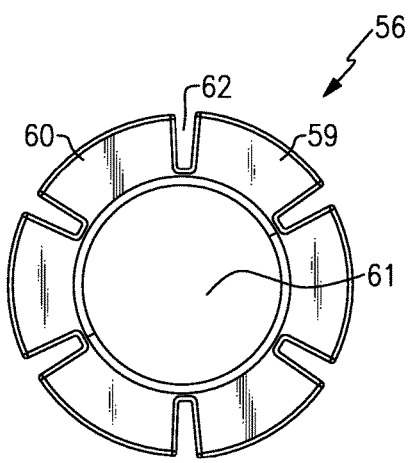
FIG. 4B illustrates a top view of the third spacer.
Figure 4C:
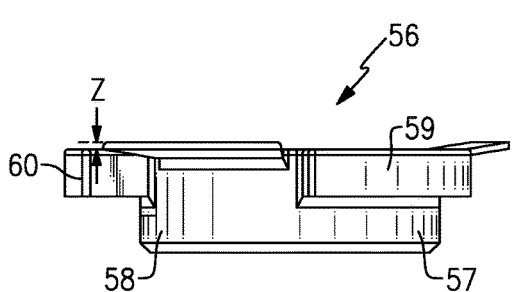
FIG. 4C illustrates a side view of the third spacer.
Figure 4D:
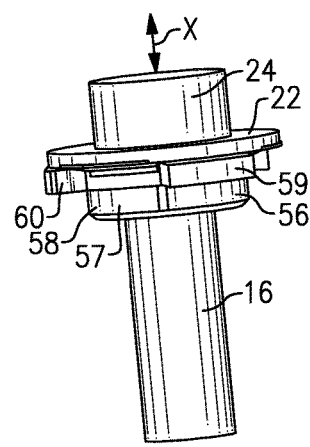
FIG. 4D illustrates the third spacer installed on the fastener.
Figure 5A:
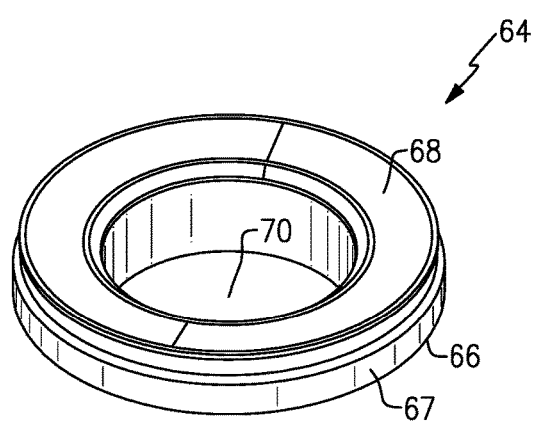
FIG. 5A illustrates a perspective view of a fourth spacer.
Figure 5B:
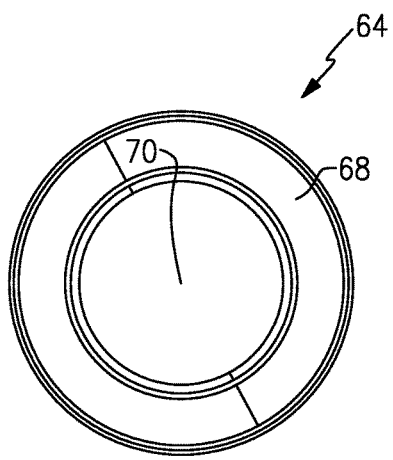
FIG. 5B illustrates a top view of the fourth spacer.
Figure 5C:
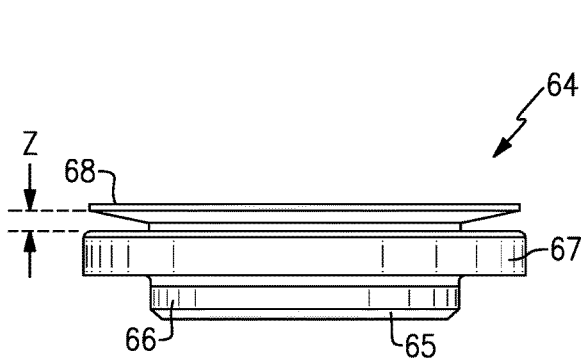
FIG. 5C illustrates a side view of the fourth spacer.
Figure 5D:
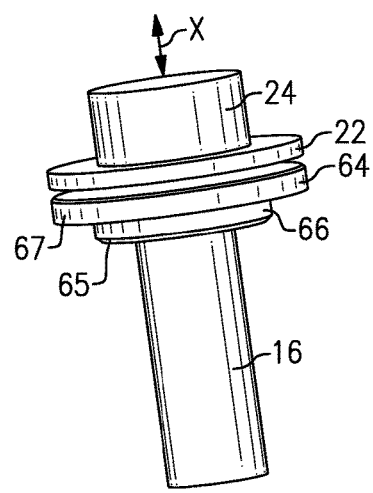
FIG. 5D illustrates the fourth spacer installed on the fastener.

The spacer 26 includes a body 30 and at least one leaflet 32 or umbrella (shown schematically in FIG. 1) that is flexible. The body 30 includes a smaller outer diameter portion 31 and a larger outer diameter portion 33. The body 30 defines the opening 28, which has a constant diameter. In one example, the at least one leaflet 32 is raised approximately 0.6 mm in distance from a surface of the spacer 26 and extends from a surface of the larger outer diameter portion 33 of the spacer 26. The at least one leaflet 32 engages the shoulder 22 of the fastener 16 after installation. A height of a burr 55 (shown in FIG. 2C) at an end portion and peripheral portion is approximately 0.2 mm. In production, each component can potentially vary in thickness along the axis of the joint. The body 30 and at least one leaflet 32 are integral and monolithic and define a single component. This allows for a reduction of parts. When installed, the larger diameter shank 20 of the fastener 16 is located in an opening 28 in the spacer 26 such that the at least one leaflet 32 engages the shoulder 22 of the fastener 16.

The spacer 26 absorbs noise and vibrations in the radial direction. When the fastener 16 is installed, the at least one leaflet 32 can compress and work as a spring and deflect towards and away from the body 30 to accommodate for movement and absorb vibrations in the axial direction. An amount of deflection depends on the thickness of each component in an axial direction. The at least one leaflet 32 is designed to accommodate worst case tolerances allowed for each component and can work to deflect accordingly and always have zero gap in the joint to prevent buzz, rattle and squeak (BRS). This allows the spacer 26 to work as a tolerance absorption mechanism in two directions, radially and axially. By eliminating the rubber or elastomeric ring or felt used in prior designs, there is a significant saving.

FIGS. 2A, 2B, 2C and 2D illustrate a first example spacer 34. The spacer 34 includes a body 36 having an opening 40 having a longitudinal axis X that receives the fastener 16. The body 36 includes a smaller diameter portion 35 and a large diameter portion 37 having a plurality of flanges 39. A plurality of leaflets 38 are each attached one of the plurality of flanges 39. In one example, the body 36 is circular, and the opening 40 is circular.

The leaflets 38 extend in a circumferential direction around the longitudinal axis X around the opening 40. A circumferential space 41 is defined between an inner curved surface of each leaflet 38 and a curved portion of the body 36, and a radial space 43 is defined between a straight surface of each leaflet 38 and a flat surface of the flange 39. The radial space 43 has a width of about 5 degrees around the longitudinal axis X, and each leaflet 38 extends about 70 degrees around the longitudinal axis X.

In one example, there are three leaflets 38. The leaflets 38 are attached to the flanges 39. The leaflets 38 are also raised slightly with respect to an upper surface of the flanges 39. In one example, the leaflets 3 are raised a distance Z from the upper surface of the flanges 39. In one example, Z is about 0.6 mm. The circumferential space 41 between each of the leaflets 38 and the body 36 allow the leaflets 38 to move axially with respect to the longitudinal axis X. The leaflets 38 press against the larger diameter shank 20 of the fastener 16 to absorb axial noises.

FIGS. 3A, 3B, 3C and 3D illustrate a second example spacer 46. The spacer 46 includes a body 48 and a plurality of leaflets 50. The body 36 includes a small outer diameter portion 51, a larger outer diameter portion 53, and an opening 52 that receives the fastener 16. The leaflets 50 extend radially from the body 48. In one example, there are four leaflets 50. The leaflets 50 are circumferentially surrounded by sections of the larger diameter portion 53. The leaflets 50 have a width that is smaller than a width of the sections of the larger diameter portion 53. The leaflets 50 are also raised slightly with respect to a surface of the outer diameter portion 53 by a distance Z. In one example, Z is about 0.6 mm. There is a gap 54 between each of the leaflets 50 and larger outer diameter portion 53 that allow the leaflets 50 to move axially with respect to the longitudinal axis X of the fastener 16. The leaflets 50 press against the larger diameter shank 20 of the fastener 16 to absorb axial noises.

FIGS. 4A, 4B, 4C and 4D illustrate a third example spacer 56. The spacer 56 includes a body 58 and a plurality of leaflets 60. The body 58 includes a small outer diameter portion 57, a larger outer diameter portion 59, and an opening 61 that receives the fastener 16. The leaflets 60 extend radially from the body 58. In one example, there are three leaflets 60. The leaflets 60 are circumferentially surrounded by sections of the larger outer diameter portion 59. The leaflets 60 have a width that is approximately equal to a width of the sections of the larger outer diameter portions 59. The leaflets 60 are also raised slightly with respect to a surface of the larger outer diameter portion 59 by a distance Z. In one example, Z is about 0.6 mm. There is a gap 62 between each of the leaflets 60 and the larger outer diameter portion 59 that allow the leaflets 60 to move axially with respect to the longitudinal axis X of the fastener 16. The leaflets 60 press against the larger diameter shank 20 of the fastener 16 to absorb axial noises.

FIGS. 5A, 5B, 5C and 5D illustrate a fourth example spacer 64. The spacer 64 includes a body 66 and a circumferential flange 68 that extends upwardly from a larger outer diameter portion 67 of the body 66 and extends 360 degrees around a longitudinal axis X. The circumferential flange 68 is also raised slightly with respect to a surface of the outer diameter portion 67 by a distance Z. In one example, Z is about 0.6 mm. The body 66 includes a small outer diameter portion 65, the larger outer diameter portion 67, and an opening 70 that receives the fastener 16. The circumferential flange 68 moves axially with respect to the longitudinal axis X of the fastener 16. The circumferential flange 68 presses against the larger diameter shank 20 of the fastener 16 to absorb axial noises.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An assembly comprising:
    a first vehicle seat component;
    a second vehicle seat component that can pivot relative to the first vehicle seat component;
    a fastener including a shank and a shoulder to secure the first vehicle seat component and second first vehicle seat component together; and
    a spacer to absorb radial vibrations, wherein the spacer includes a body, an opening having a longitudinal axis, and at least one flexible leaflet, wherein the body includes a smaller diameter portion and a large diameter portion, and the at least one flexible leaflet is located between the smaller diameter portion of the body and the shoulder of the fastener to absorb axial vibrations, wherein the body and the at least one leaflet are integral and monolithic to define a single component, wherein the opening of the spacer includes a first portion having a cylindrical inner surface that is substantially parallel to the longitudinal axis and having a constant diameter and a second portion angled with respect to the first portion.

2. The assembly as recited in claim 1 wherein the first seat component is a component of a frame subassembly of a vehicle seat back, and the second seat component is a component of a seat cushion.

3. The assembly as recited in claim 2 wherein the second seat component is a resilient assembly.

4. The assembly as recited in claim 1 wherein the fastener includes a larger diameter shank received in the opening in the spacer, and the at least one leaflet engages the shoulder of the fastener.

5. The assembly as recited in claim 1 wherein the larger diameter portion is defined by a flange.

6. The assembly as recited in claim 5 the at least one flexible leaflet is attached to the body by the flange.

7. The assembly as recited in claim 5 wherein a circumferential space is defined between each of the at least one flexible leaflet and the body, and a radial space is defined between a straight surface of each the at least one flexible leaflet and a flat surface of the flange.

8. The assembly as recited in claim 1 wherein an end of the at least one flexible leaflet is raised approximately 0.6 mm from an upper surface of the body.

9. The assembly as recited in claim 1 wherein the at least one flexible leaflet extends around the body in a circumferential direction.

10. The assembly as recited in claim 1 wherein the at least one flexible leaflet comprises three leaflets.

11. The assembly as recited in claim 1 wherein the at least one flexible leaflet comprises a plurality of flexible leaflets, and each of the plurality of flexible leaflets are secured to the large diameter portion of the body and extend in a common circumferential direction.

12. The assembly as recited in claim 1 wherein the at least one flexible leaflet is inclined relative to the large diameter portion of the body in a direction towards the shoulder of the fastener.

13. The assembly as recited in claim 1 wherein the second portion is a flat surface.

14. The assembly as recited in claim 1 wherein the second portion angles upwardly and outwardly from the first portion.

15. An assembly comprising:
    a first vehicle seat component;
    a second vehicle seat component that can pivot relative to the first vehicle seat component;
    a fastener including a shank and a shoulder to secure the first vehicle seat component and second first vehicle seat component together, wherein the fastener a larger diameter shank and a shoulder, the larger diameter shank of the fastener is received in an opening in the spacer, the opening having a longitudinal axis, and the at least one leaflet engages the shoulder of the fastener; and
    a spacer to absorb radial vibrations, wherein the spacer includes a body and at least one flexible leaflet, wherein the body includes a smaller diameter portion and a large diameter portion, and the at least one flexible leaflet is located between the smaller diameter portion of the body and the shoulder of the fastener to absorb axial vibrations, wherein the body and the at least one leaflet are integral and monolithic to define a single component, the at least one leaflet extends around the body in a circumferential direction, and the at least one leaflet comprises three leaflets, wherein the opening of the spacer has a cylindrical inner surface that is substantially parallel to the longitudinal axis and having a constant diameter and a second portion angled with respect to the first.

16. The assembly as recited in claim 15 wherein the first seat component is a component of a frame subassembly of a vehicle seat back, and the second seat component is a component of a seat cushion.

17. The assembly as recited in claim 16 wherein the second seat component is a resilient assembly.

18. The assembly as recited in claim 15 the larger diameter portion is defined by a flange.

19. The assembly as recited in claim 18 the at least one flexible leaflet is attached to the body by the flange.

20. The assembly as recited in claim 18 wherein a circumferential space is defined between each of the at least one leaflet and the body, and a radial space is defined between a straight surface of each the at least one flexible leaflet and a flat surface of the flange.

21. The assembly as recited in claim 15 wherein an end of the at least one flexible leaflet is raised approximately 0.6 mm from an upper surface of the body.

22. The assembly as recited in claim 1 wherein the at least one flexible leaflet located is between the body and the shoulder of the fastener along a longitudinal axis of the fastener.

23. The assembly as recited in claim 15 wherein the at least one flexible leaflet is located between the body and the shoulder of the fastener along a longitudinal axis of the fastener.

24. The assembly as recited in claim 15 wherein the second portion is a flat surface.

25. The assembly as recited in claim 15 wherein the second portion angles upwardly and outwardly from the first portion.

26. An assembly comprising:
a first vehicle seat component;
a second vehicle seat component that can pivot relative to the first vehicle seat component;
a fastener including a shank and a shoulder to secure the first vehicle seat component and second first vehicle seat component together; and
a spacer to absorb radial vibrations, wherein the spacer includes a body, an opening having a longitudinal axis, and at least one flexible leaflet, wherein the body includes a smaller diameter portion and a large diameter portion, and the at least one flexible leaflet is located between the smaller diameter portion of the body and the shoulder of the fastener to absorb axial vibrations, wherein the body and the at least one leaflet are integral and monolithic to define a single component, wherein the opening of the spacer includes a first portion having a cylindrical inner surface that is substantially parallel to the longitudinal axis and having a constant diameter and a second portion angled with respect to the first portion, wherein the second portion is a flat surface, and the second portion angles upwardly and outwardly from the first portion.

* * * * *